United States Patent [19]

Churchland

[11] 4,456,498

[45] Jun. 26, 1984

[54] MICROWAVE APPLICATOR FOR CONTINUOUS PRESS

[75] Inventor: Mark T. Churchland, Burnaby, Canada

[73] Assignee: MacMillan Bloedel Limited, Vancouver, Canada

[21] Appl. No.: 406,769

[22] Filed: Aug. 10, 1982

[51] Int. Cl.³ .................. B30B 5/02; B30B 5/04; B30B 15/34; H05B 6/64

[52] U.S. Cl. .................. 156/275.5; 156/273.7; 156/580; 156/583.1; 156/583.5; 219/10.55 A; 333/137

[58] Field of Search .............. 156/272.2, 273.5, 273.7, 156/381, 379.8, 580, 275.5, 582, 583.1, 583.5, 389; 219/10.55 R, 10.55 A, 10.55 D, 10.55 M; 34/1; 333/137, 125

[56] References Cited

U.S. PATENT DOCUMENTS

| | | | |
|---|---|---|---|
| 2,779,969 | 2/1957 | Bose | 18/5 |
| 2,909,804 | 10/1959 | Means | 18/4 |
| 3,027,291 | 3/1962 | Foster et al. | 156/389 |
| 3,044,111 | 7/1962 | Caughey | 18/4 |
| 3,120,862 | 2/1964 | Burger | 144/281 |
| 3,166,462 | 1/1965 | Schoder | 156/582 |
| 3,568,245 | 3/1971 | Jetzer | 18/4 |
| 3,594,530 | 7/1971 | Wiegmann et al. | 219/10.55 A |
| 3,622,733 | 11/1971 | Smith | 219/10.55 A |
| 3,644,161 | 2/1972 | Hall | 156/272.2 |
| 3,670,133 | 6/1972 | Admiraal | 219/10.55 A |
| 3,710,064 | 1/1973 | Mathur | 219/10.55 A |
| 3,711,674 | 1/1973 | Admiraal | 219/10.55 A |
| 3,712,971 | 1/1973 | Admiraal | 219/10.55 A |
| 3,723,230 | 3/1973 | Troutner | 156/580 |
| 3,851,685 | 12/1974 | Ahrweiler | 156/583 |
| 3,890,077 | 6/1975 | Holman | 425/111 |
| 3,910,179 | 10/1975 | Troutner | 100/154 |
| 3,992,135 | 11/1976 | Camp | 425/174.2 |
| 4,018,642 | 4/1977 | Pike et al. | 156/272.2 |
| 4,020,311 | 4/1977 | Churchland | 219/10.55 A |
| 4,025,272 | 5/1977 | Camp | 425/324 R |
| 4,035,223 | 7/1977 | Russell | 156/580 |
| 4,061,819 | 12/1977 | Barnes | 428/294 |
| 4,093,840 | 6/1978 | Jean | 219/10.55 F |
| 4,124,823 | 11/1978 | Sechi | 333/125 |

FOREIGN PATENT DOCUMENTS

| | | | |
|---|---|---|---|
| 974356 | 9/1975 | Canada | 18/44 |
| 1203943 | 10/1965 | Fed. Rep. of Germany | 156/389 |
| 8820275 | 11/1947 | Japan . | |

OTHER PUBLICATIONS

Ishii, Microwave Engineering, 108–110, 135–136 (1966).
Engineering Abstracts, 137–140 (1/1947).
Contipress.

*Primary Examiner*—Edward C. Kimlin
*Assistant Examiner*—Merrell C. Cashion
*Attorney, Agent, or Firm*—Banner, Birch, McKie & Beckett

[57] ABSTRACT

The present invention provides an apparatus for the simultaneous application of pressure and microwaves to a curable assembly, comprising (1) a continuous press including two endless press belts forming a nip region, the press belts being disposed to apply pressure to curable assemblies inserted therebetween, and including an inlet and an outlet for the passage of curable assemblies, (2) a press chamber defined by the two substantially parallel belt surfaces in the nip region and by two side walls, (3) means to apply microwaves to the curable assemblies from at least one microwave generator through a waveguide forming an interface with the press chamber located in an opening in a side wall, and (4) dam means at the interface between the waveguide and the press chamber to withstand the lateral pressure exerted thereon by curable assemblies being pressed, and which effectively permits propagation of microwaves into the press chamber. The press includes a means at the interface between the waveguide and the press chamber to substantially equalize fringing electric fields before the microwaves reach the curable assembly to be treated by pressure and microwaves and the waveguide includes wave chokes. A method of curing assemblies is also disclosed.

23 Claims, 12 Drawing Figures

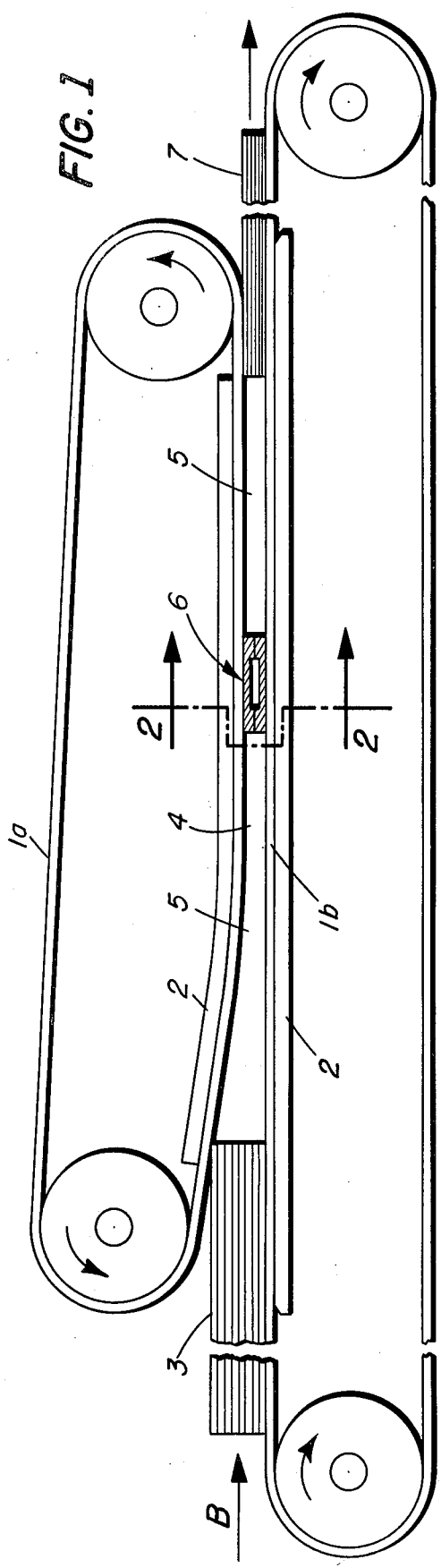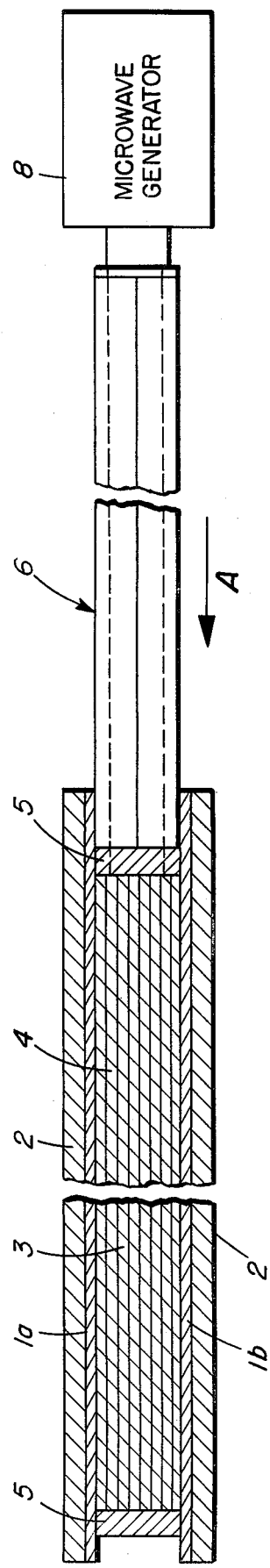

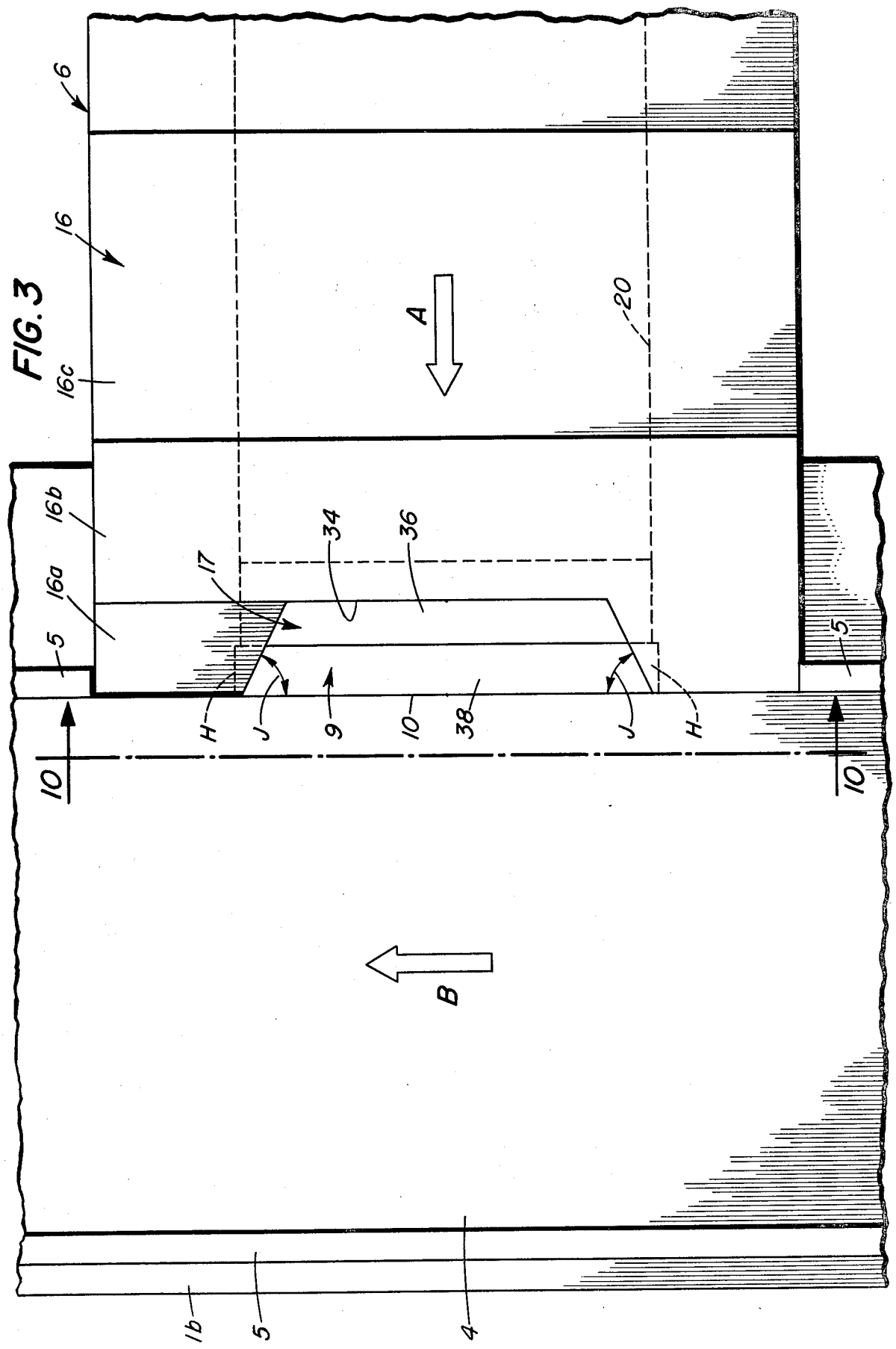

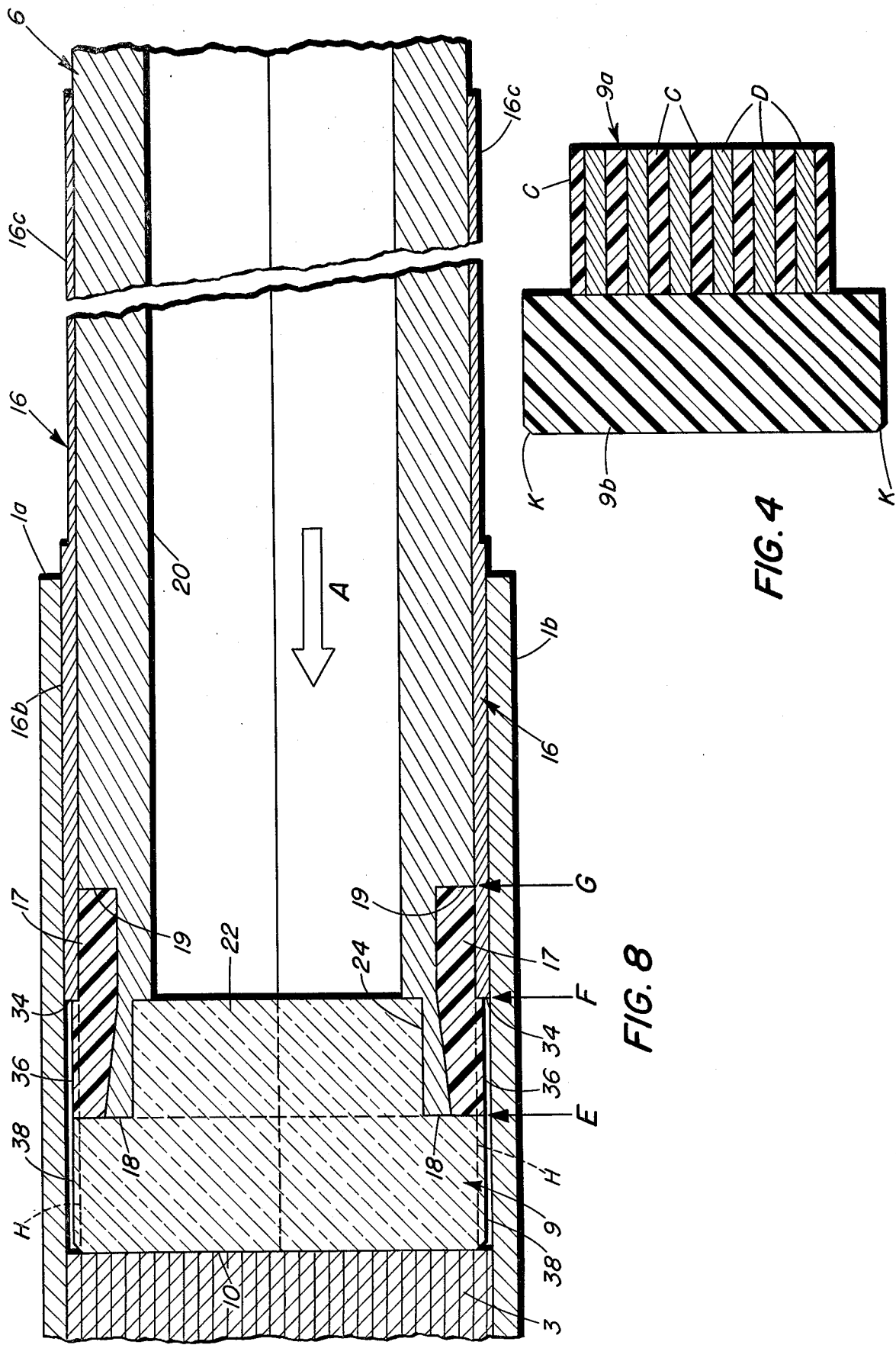

MICROWAVE APPLICATOR FOR CONTINUOUS PRESS

This invention relates to the continuous manufacture of composite adhesively-bonded products in which pressure and microwave heat are applied simultaneously in a continuous press to curable assemblies so that the adhesive bonding agent is cured or set while the product is pressed and/or maintained at desired dimensions and density.

More specifically, this invention relates to a continuous press, having a press chamber including two opposing side walls or "side dams", two opposing surfaces formed by endless press belts which are designed to apply pressure to a curable assembly passed through the press chamber, and an inlet and outlet permitting the insertion and extraction of curable assemblies to be treated. Normally, the side dams, the inlet and the outlet constitute the four "sides" of the press chamber and the opposing surfaces constitute the top and bottom thereof. The press has at least one microwave source, placed in a side dam of the press chamber, so that a curable assembly may be passed through the press chamber and simultaneously subjected to microwave heat and pressure in the press, the microwaves being applied to cure the assembly while the assembly is under compression. The microwave source includes a microwave generator and a microwave waveguide, the latter being installed in the side dam of the press chamber so that microwaves may propagate therethrough from the generator and into curable assemblies in the press chamber.

U.S. Pat. Nos. 4,018,642 and 4,020,311 disclose simultaneously applying microwaves and pressure to a curable assembly. While these patents broadly contemplate the use of a continuous press, working embodiments of such treatment using a continuous press are not explained in detail.

It has been determined that three problems of particular difficulty occur in operating equipment as described above. First, the interface between the waveguide and the curable assembly may be subjected to considerable lateral pressure resulting from the vertical pressure applied to the curable assembly. This pressure tends to push back the interface in a direction away from the center of the press chamber. If this interface is an open waveguide port, the curable assembly may become jammed or damaged by protruding into the waveguide. If the interface, on the other hand, is defined by a solid material, it must be strong enough to withstand the lateral pressure and desirably also resist the resulting abrasive action of the curable assembly as it moves past the interface, while still allowing passage of the microwave energy.

The second problem concerns the junction between the waveguide and the belts of the press, when the presss employs metal belts (the conventional case). Since one function of the interface is to exert lateral restraint against expansion of the curable assembly as it is pressed, it is important that the interface exert restraint over substantially the full distance between the two belts. However, microwave energy tends to enter into the gap between the belts and the interface, causing electrical arcing which can destroy the belts, a portion of the waveguide or the solid interface material. In addition, the belt is often displaced from side-to-side during operation of the press so that it does not have an edge that is in a fixed lateral position.

The third problem concerns the evenness of microwave heating of the curable assembly. The end of the waveguide at the interface can cause the generation of irregular fringing electric fields, since maximum distortion of microwaves occurs around such abrupt corners in propagation pathways. If these irregular fields reach the curable assembly they can cause localized overheating which is detrimental to the curable assembly. Accordingly, it is highly desirable to provide a means to substantially equalize these fringing fields before the microwaves reach the curable assembly to be treated.

It is an object of the present invention to provide an improved means for simultaneously exposing curable assemblies to pressure and microwave energy.

It is another object of the present invention to provide an interface between a microwave waveguide and the press chamber in a continuous press, through which microwave energy may be directed into a curable assembly, which is strong enough to withstand the lateral pressure exerted thereon by the curable assembly and also the resulting abrasive action of the curable assembly as it moves past the interface.

It is still another object of the pesent invention to provide a means in a press capable of simultaneously exposing a curable assembly to pressure and microwave energy, whereby damage caused by electrical arcing at the point of contact between the microwave waveguide and metal belts of a press is substantially eliminated.

It is also an object of the present invention to provide a means at the interface between the waveguide and the press chamber to substantially equalize fringing electric fields before the microwaves reach the curable assembly to be treated by pressure and microwaves.

In accordance with the present invention, an apparatus for the simultaneous application of pressure and microwaves to a curable assembly is provided, comprising (1) a continuous press including two endless metal press belts forming a nip region, the press belts being disposed to apply pressure to curable assemblies inserted therebetween, and including an inlet and an outlet for the passage of curable assemblies, (2) a press chamber defined by the two belt surfaces and by two side walls, (3) means to apply microwaves to the curable assemblies from at least one microwave generator through a waveguide forming an interface with the press chamber located in an opening in a side wall, said waveguide spanning substantially the entire vertical spacing between said belts, and (4) dam means at the interface between the waveguide and the press chamber to provide a solid interface between the curable assembly and the waveguide to withstand the lateral pressure exerted thereon by curable assemblies being pressed, and which effectively permits propagation of microwaves into the press chamber, said microwaves having an electric vector substantially normal to said press belts, said dam means being selected from the group consisting of a solid ceramic member and a reinforced member containing spaced metal elements normal to the electric vector of the microwave field.

The metal portions of said waveguide are positioned from the near-side edge of the curable assembly at a distance sufficient to permit substantial equalization of fringing electric fields. The waveguide includes a $\frac{1}{4}$ wave choke adjacent each moving belt.

Curing assemblies with microwaves in a continuous press offers substantial advantages. Microwave heating is rapid as compared to conventional heating and therefore implicitly offers a potential of high production rates. A continuous press also offers the potential of high production rates as compared to batch processes. Combining microwave heating with a continuous press combines the benefits of each to optimize production rates. Moreover, the continuous process imposes no limitation on length of the cured assembly and minimizes trim loss.

The combination of a continuous press with microwave heating as provided by this invention also results in a more even heating of the assembly than would occur with microwave batch heating. Since the assembly moves at a uniform rate through the microwave field, variations in heating along the assembly tend to be minimized. Moreover, since the electric field tends to be uniform in a vertical direction, variations of heating in this direction also tend to be minimized.

This invention provides a realistic solution to the problems which attend and have hindered any attempt to cure assemblies in a continuous press employing microwaves. Therefore, this invention permits the practical realization of the above significant benefits which flow from the use of microwave heating with a continuous press.

Additional embodiments of the invention will be apparent from the following description. The invention will be better understood by reference to the detailed description, taken in conjunction with the appended drawings in which:

FIG. 1 illustrates a side elevational cross-section of a continuous embodying the general concept of the invention.

FIG. 2 illustrates a front elevational cross-section of the press section of a continuous press, taken on line [2—2] of FIG. 1.

FIG. 3 schematically illustrates a plan view of the press section of a continuous press.

FIG. 4 illustrates a side elevation of a sandwich-type window dam.

Figure 5:
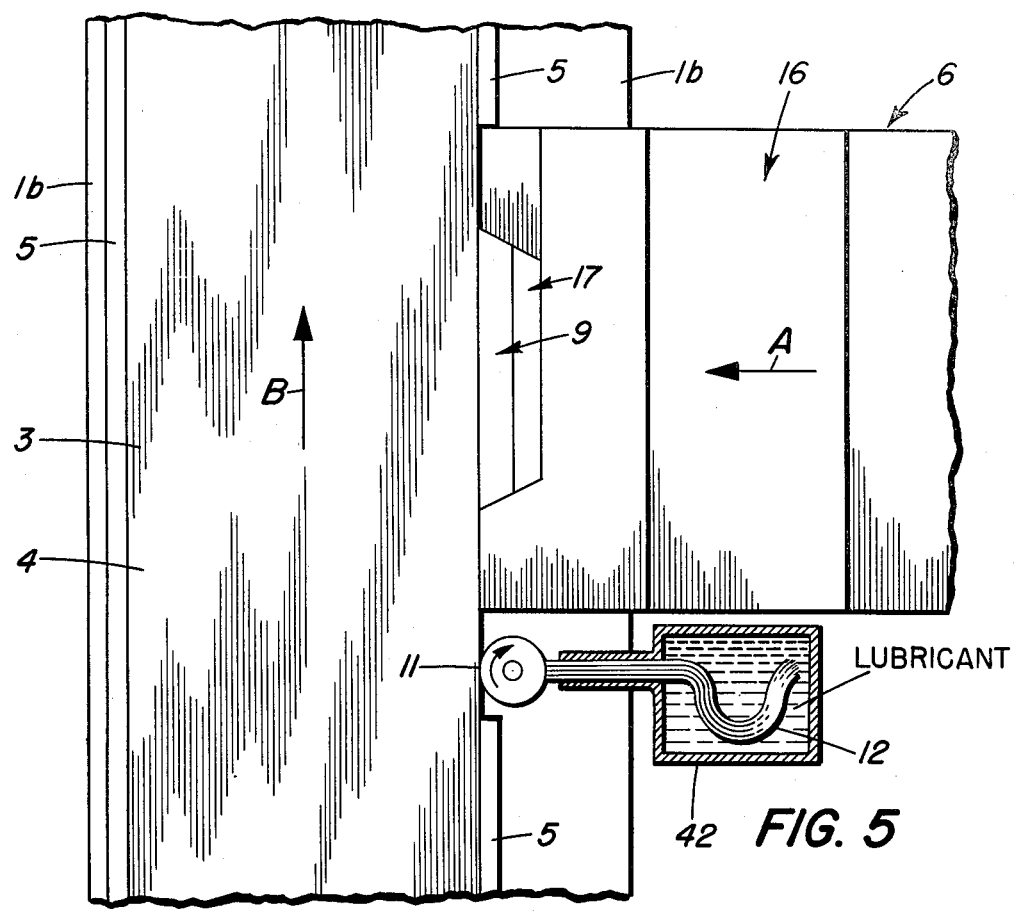

FIG. 5 illustrates a plan view of the press section of a continuous press, incorporating a roller fed by a wick with a lubricant.

Figure 6:
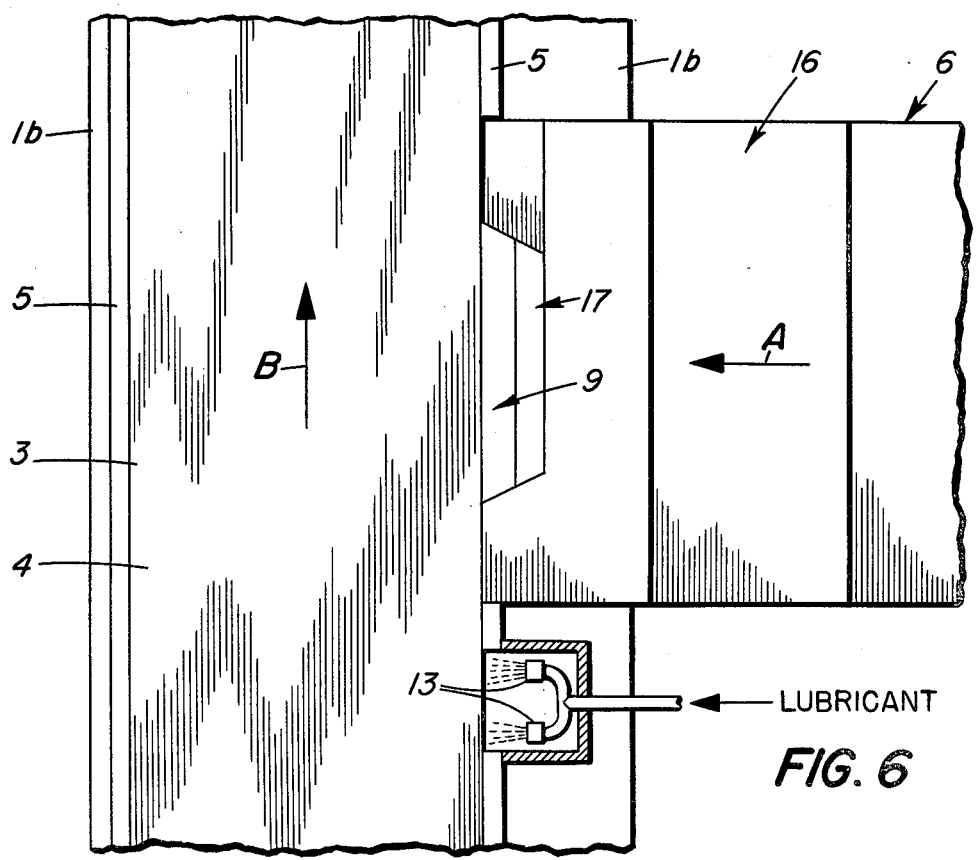

FIG. 6 illustrates a plan view of the press section of a continuous press, incorporating nozzles which may be employed to spray a lubricant onto curable assemblies passing through the press section.

Figure 7:
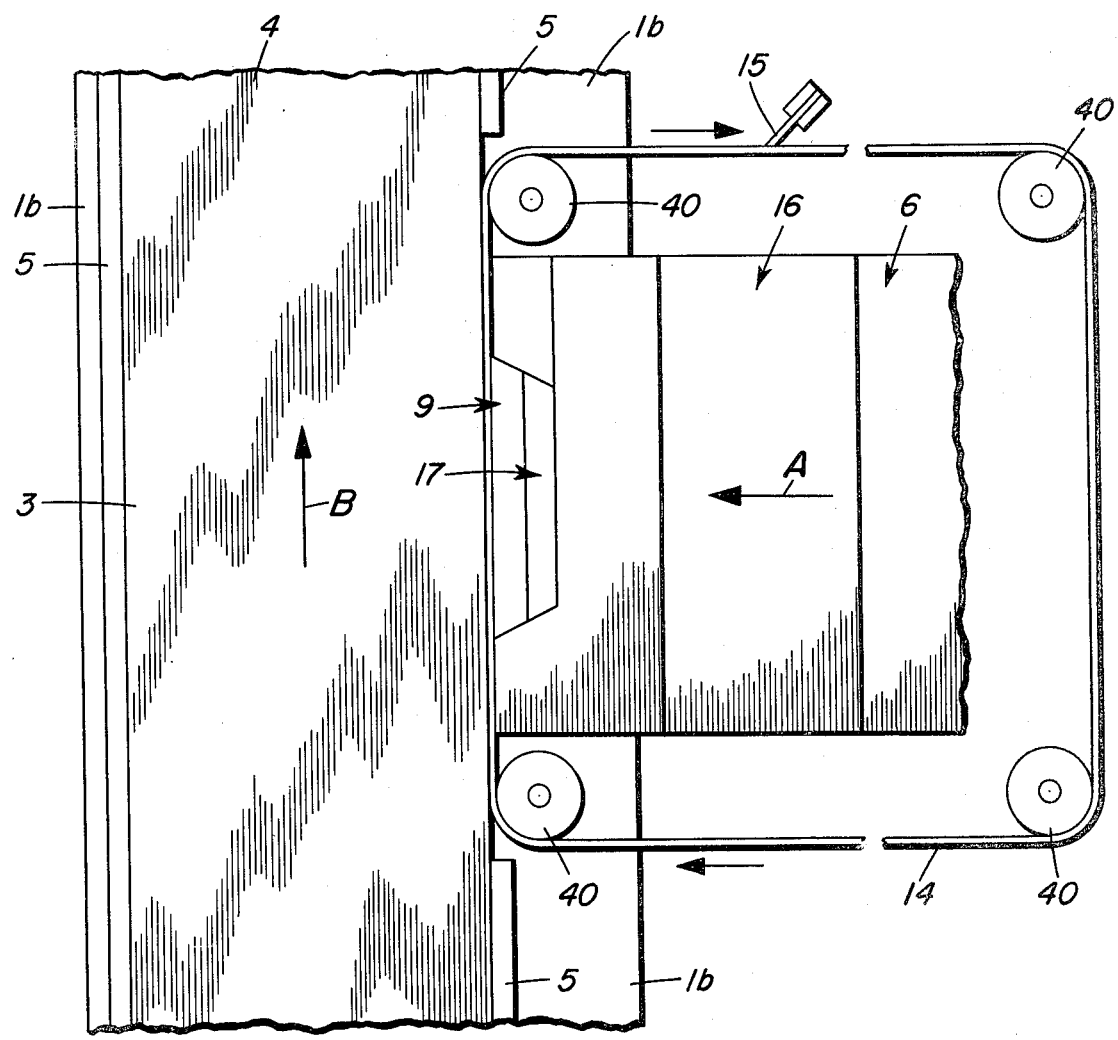

FIG. 7 illustrates a plan view of the press section of a continuous press, incorporating an endless belt which is fed past the interface of the window dam.

FIG. 8 illustrates a cross-sectional front elevation of the press section of a continuous press incorporating a ¼ wave choke.

Figure 9:
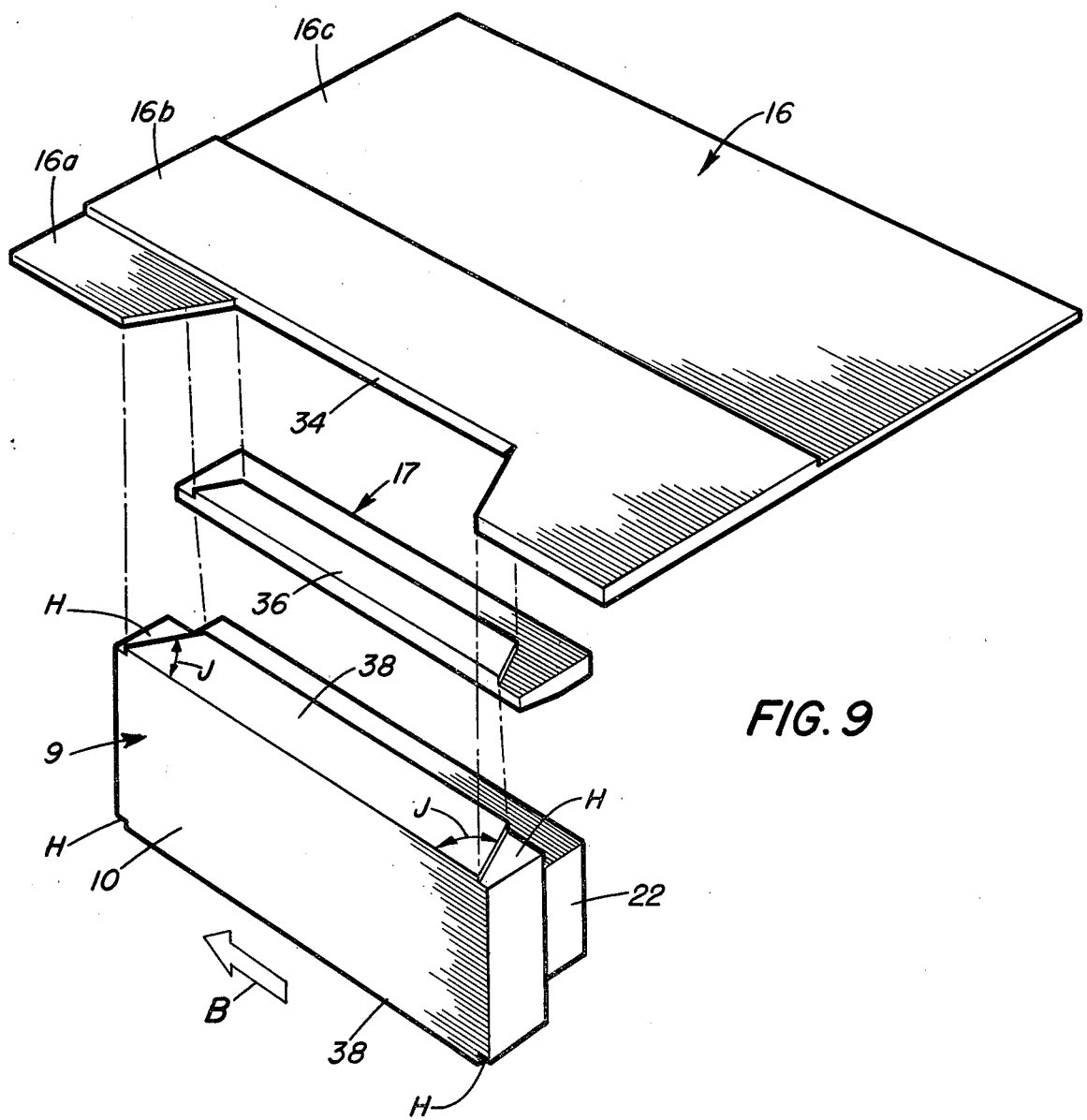

FIG. 9 illustrates a perspective view of a window dam, choke wedge and metal plate and show schematically their relative orientation in a continuous press of the invention.

Figure 10:
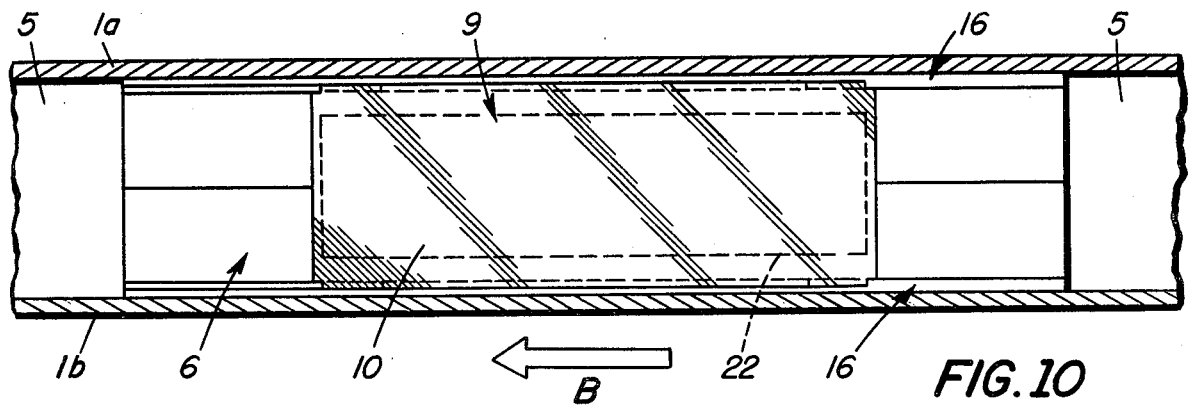

FIG. 10 illustrates a side elevational cross-section of the press section of a continuous press taken on line [10—10] of FIG. 3.

Figure 11:
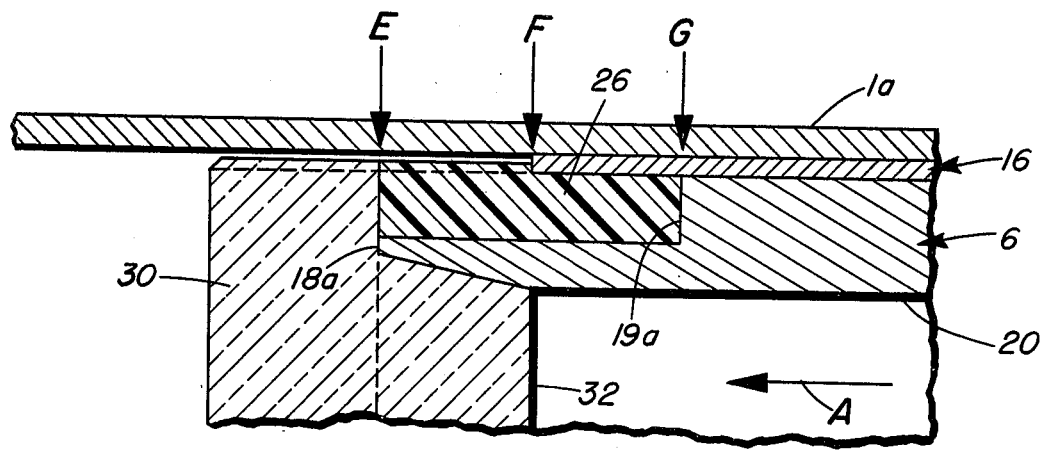

FIG. 11 illustrates a cross-sectional elevation of a ¼ wavelength choke system of the invention.

Figure 12:
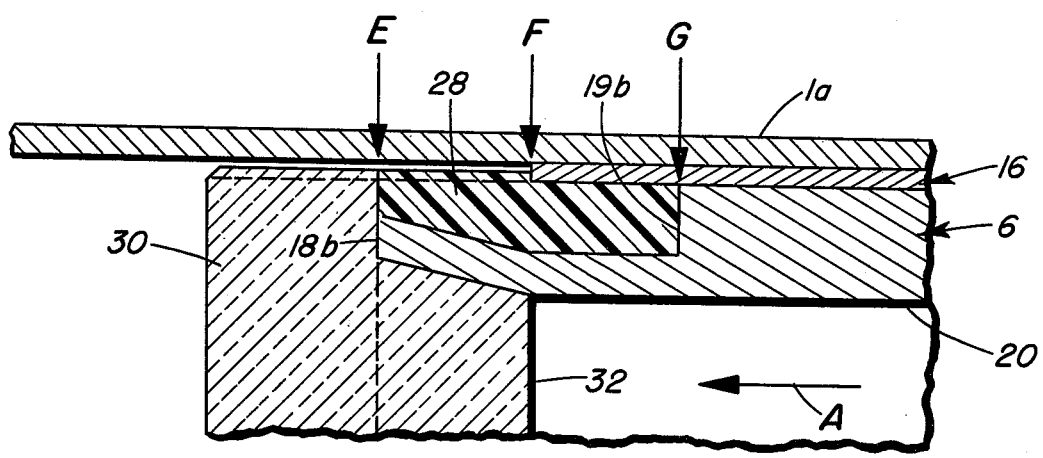

FIG. 12 illustrates a cross-sectional elevation of another ¼ wavelength choke system of the invention.

In accordance with this invention, curable assemblies are advanced through a continuous press while microwave energy having a frequency of at least about 100 MHz is applied thereto. The curable assemblies are heated at least to the curing temperature of the adhesive binder but below the scorching temperature of the curable assemblies, while being compressed.

The curable assemblies to be subjected to the treatment of the invention desirably comprise wood materials which can be subjected simultaneously to pressure and microwave energy to form cured, consolidated products. Such products include, as representative examples, particleboard, fiberboard, waferboard, plywood, laminated veneer lumber, parallel strand lumber, and laminated beams. The invention is particularly advantageous for use in the treatment of curable assemblies having a minimum dimension in excess of 1 inch. Preferably, the curable assemblies comprise a wood material coated with an adhesive.

In a preferred embodiment of the invention, the curable assemblies comprise long wood strands and a suitable adhesive. The wood strands may consist of straight wood strands having a first average cross-sectional dimension of about ⅛ inch to about 1 inch, a second average cross-sectional dimension of about ⅛ inch to about 1 inch, and lengths of at least about 12 inches, (preferably at least about 24 inches). Suitable wood strands are disclosed, for example, in U.S. Pat. No. 4,061,819. Suitable wood strands may be prepared by splitting or cutting of logs, or by splitting or cutting of wood veneer using methods known in the art.

The moisture content of the wood materials prior to treatment by the process of the invention generally will broadly range from about 5–20% by weight. However, this moisture content range is merely a general guideline, and may be departed from. Optimum moisture content for curable assemblies is preferably determined on a case-by-case basis and it is within the skill of the art to correlate moisture levels with curable assembly dimensions in order to make such determinations. It is possible to treat wood having a moisture content approaching zero, but the limited plasticity of wood under such conditions make this less desirable. Additionally, some moisture or other lossy material is necessary to act as an absorber of microwave energy. The moisture content may be augmented by employing a water-containing adhesive. Since microwave absorbance by water increases with increasing water content in the wood, excessively high moisture content in the wood is undesireable. Such excess results in excessive microwave absorbance near the outer surface of the wood, thus attenuating penetration of microwaves into the wood to below acceptable levels.

If desired, fire retardants, preservatives, colorants, waxes and the like may be added to the raw materials used to form the curable assemblies.

The adhesive to be employed in the practice of this invention as it relates to wood is preferably an alkaline phenolic resin. However, it may be any adhesive whose rate of cure is accelerated by the application of heat. Water-soluble and non-water-soluble alkaline and acidic phenolic resins, resorcinol-formaldehyde resins, urea-formaldehyde resins, and isocyanate resins, for example, can be employed. The resin may be applied to the wood materials in any desired amount. When employing long wood strands, the resin content will often range from about 1 to about 10% of the dry weight of the wood. Most often, the resin will be applied in an amount ranging from about 2 to about 5% of the dry weight of the wood.

In the practice of this invention a waveguide is employed and microwaves in the form of propagating transverse electric traveling waves are conducted through the waveguide into the curable assemblies. In Canada and the United States federal regulations dictate that for industrial microwave applications frequencies of 915 MHz or 2450 MHz must be employed. In other countries different frequencies may be allocated. In general it has been found that frequencies as low as about 100 MHz can be employed, if their use is permitted. The upper frequency limit is not critical and is set by practical considerations, since there is a direct relationship between the optimum size of a waveguide and the frequency of the electromagnetic wave that can be conducted through it. Practically speaking, about 10,000 MHz is a reasonable upper limit although at this frequency, the penetration of the microwave energy in the work product tends to become restricted. Accordingly, microwave frequencies ranging from about 100 MHz to about 10,000 MHz will generally be employed.

Commercially available microwave power sources which may be effectively employed in the practice of the invention include, inter alia, Varian magnetrons and RCA magnetrons having a power output of 25–30 Kw and operating at 915 MHz, of klystrons which are available at a variety of power outputs and frequencies.

In practice, it is preferable for the microwaves to be propagated in the waveguide in a $TE_{n0}$ mode, where n is any integer. In one embodiment of the invention, the $TE_{10}$ mode is used. It is to be understood that in the $TE_{n0}$ modes as used in this invention, the electric field vector is substantially normal to the planes of the press belts in the press chamber for even heating of curable assemblies. Preferably, the waveguide dimensions are chosen to allow only the $TE_{10}$ mode of microwave propagation in the waveguides.

Where curable assemblies comprising wood strands coated with resin are treated according to the invention, the resin is cured in a substantially even manner. The curable assemblies are subjected to the microwave treatment for a time period suitable to heat them to a selected temperature to initiate cure of the resin. This is accomplished by continuously moving the curable assemblies past the microwave source at a suitable linear speed. Linear speeds may be determined by one skilled in the art. Broadly, when using phenol-aldehyde resins, the temperature for wood products may range from about 100° C. to about 170° C.; more preferably the temperature may range from about 110° C. to about 150° C.; and most preferably the temperature to which the curable assemblies are heated may range from about 115° C. to about 120° C. The cure of an assembly may be completed, if desired, after the assembly leaves the microwave area.

Optionally, microwave heating in the press may be supplemented by heating the press belts conventionally, e.g., by heating platens over which the belts may run, using, for example, steam or oil. Means for implementing such conventional press heating are well known in the art.

The wood strands are suitably aligned and otherwise arranged in overlapping configuration and directed into the continuous press.

The continuous press used in the process of the invention, which may be a conventional press of the type disclosed in U.S. Pat. Nos. 3,120,862; 3,723,230; or 3,851,685, generally includes two belts adjustably placed with a gap therebetween, through which the material to be compressed may be passed. Commercially available continuous presses made by the Eduard Kusters Machinenfabrik (see, e.g., U.S. Pat. No. 3,851,685), for example, may be used.

The press belts are preferably stainless steel belts, and the invention is described with reference to them. However, other types of metal belts such as molybdenum belts may be used. The belts may optionally be coated with a plastic material. For example, stainless steel press belts coated with a film of polytetrafluoroethylene may be used. Alternatively, a belt having a metal coating on a non-metallic support may be used. Such a metal coating is necessary as the press belts constitute a part of the metal waveguide.

The belts should be arranged in a manner to minimize internal stresses that are imparted to the composite product during compression of the curable assemblies in a curved condition, the effective radius of curvature of the converging inlet portion of the belts at the point of lock up should be made large. To relieve internal stress caused by an angular build up which occurs with stacked wood strands, the inlet end of the upper belt platen can be located downstream of the lower belt platen.

Dimensions of the curable assemblies will be a matter of choice within the discretion of those skilled in the art. The linear speed of the composite assemblies in the press often will range from about 0.5 foot per minute up to about 50 feet per minute or more. More often, the linear speed will range from about 1 to about 30 feet per minute.

The pressure applied to the curable assemblies may vary depending on a number of factors, including the desired density of the final product and the moisture content of the curable assembly. Where the curable assembly comprises wood strands, typical pressures are 400 psi or more. Often pressures are from about 400 to about 1,000 psi for soft woods. Other materials may require still other pressures. These parameters may readily be determined by one skilled in the art for wood as well as for other materials.

FIG. 1 illustrates a side elevational cross-section of a continuous press embodying the general concept of the invention. The continuous press depicted in this exemplification comprises two steel press belts having belt positioning means, including upper belt (1a) and lower belt (1b), which loop back upon themselves so as to be continuous belts. Pressure transfer means (2) transfer compressive force to the steel press belts (1a) and (1b). (It is to be understood that means for generating compressive force between the press belts of the continuous press are well known to those skilled in the art.) In the embodiment shown, the steel press belts (1a) and (1b) are driven in the direction of the arrow (B). In operation, a curable assembly (3) moving in the direction (B) enters the nip of the continuous press and is compressed to a maximum degree upon reaching the press section (4) of the press. Side walls (5) prevent the curable assembly (3) which is under compression from escaping laterally from the press section (4) of the continuous press. While the curable assembly (3) is under compression in the press section (4), microwaves are directed from a microwave generator (not shown) into the curable assembly through a waveguide (6). After passing the end of the press section (4) of the continuous press, a cured assembly (7) is removed from the press.

The waveguide (6) may be positioned so that the opening thereof is within the nip of the steel press belts. The press belts (1a) and (1b) provide a constant gap between them. That is, the press belts will not crush the waveguide (6). Hence, when a curable assembly (3) is directed into the apparatus of the invention, the microwaves are applied while the curable assembly is under compression.

FIG. 2 illustrates a front elevational cross-section of the press section of a continuous press, taken on line [2—2] of FIG. 1. The microwave generator (8) is employed to produce microwaves which are directed through the waveguide (6) in the direction (A) into the press section (4) of the continuous press.

FIG. 3 schematically illustrates a plan view of the press section of the continuous press. The upper steel press belt (1a) has been cut away to show the interior of the press section (4) of the continuous press. The press section (4) contains side walls (5) which substantially bridge the gap between the press belts (1a) and (1b); means (not shown) are provided to rigidly maintain the side walls in position. The side walls prevent lateral movement of curable assemblies being compressed by the press belts. One or both of the side walls may be adjustable so that the width of the press chamber through which curable assemblies pass may be varied as desired. The waveguide (6) is positioned so that it joins with one of the side walls (5), and microwaves from the microwave generator (not shown) may be directed thereby into the press section (4) of the continuous press. Normally, the press is oriented so that the planes of the press belts in the press section of the press are substantially horizontal and parallel; other press orientations are possible.

According to one embodiment of the invention, a window dam (9) is provided (see FIG. 3) which forms an interface (10) between the press section (4) and the waveguide (6). One embodiment of a window dam (9) is shown in perspective view in FIG. 9. The "window dam" which provides the interface between the curable assemblies and the microwave source is made of a material or composition at least a part of which will allow the passage of microwave energy, but which is strong enough to withstand the lateral pressure exerted thereon by the curable assemblies and desirably also the resultant abrasive action as the curable assemblies move past the interface.

FIG. 3 also schematically illustrates other aspects of various embodiments of the invention, including a "metal plate" (16) and a choke insert (17), which will be described in detail below.

In one embodiment of the invention, the interface comprises a window dam made by sandwiching layers of a metal between layers of a microwave-transparent material, the front face of the window dam acting as the interface with the curable assemblies. Such a sandwich-type dam functions as a series of stacked waveguides. A side elevation of a sandwich-type dam (generally conforming to the shape of the window dam shown in FIG. 9) is illustrated in FIG. 4. In the window dam (9a), the layers labeled "C" may be polytetrafluoroethylene layers; the layers labeled "D" may be aluminum layers which may be affixed to the waveguide housing. In such a window dam the aluminum provides the required mechanical strength, while the polytetrafluoroethylene provides pathways for microwave energy. The dam should not be constructed of polytetrafluoroethylene alone, because often polytetrafluoroethylene alone does not have sufficient mechanical strength to resist the lateral force and friction developed in the pressing area. In one embodiment at 915 MHz, the layers of aluminum and polytetrafluoroethylene were each about ⅛ inch thick. However, the thickness of sandwiched layers is not critical and may be adjusted to fit any given waveguide aperture and to meet any given requirement for mechanical strength or for transmittance of microwaves. Such aluminum/polytetrafluoroethylene sandwiches may be constructed using conventional techniques known to one skilled in the art.

Metals other than aluminum such as magnesium, stainless steel, titanium, or mixtures thereof, having the required mechanical strength and not otherwise adversely affecting the press system, may be used. Similarly, materials other than polytetrafluoroethylene having transparency to microwave energy, may be employed in the sandwich. Such materials may include plastics or ceramics.

The presence of the polytetrafluoroethylene layers in the aluminum/polytetrafluoroethylene sandwich embodiment of this invention is not strictly necessary for the operation of the microwave window dam, although the polytetrafluoroethylene does add some mechanical stability to the window dam. In another embodiment of the invention, the window dam may essentially comprise metal layers separated by air gaps.

When a sandwich configuration is employed, the metal edges nearest the work piece (curable assembly) will tend to result in distorted electric fields which may cause localized overheating near the edges of the workpiece. Preferably, therefore, the metal edges of the sandwich are spaced from the workpiece by a microwave-transparent spacing member (9b) as shown in FIG. 4. Such member can be polytetrafluoroethylene (or any of the other microwave-transparent materials identified herein). The spacing member permits the distorted electric fields to become more uniform before reaching the curable assembly. The edges of this spacing member or of the window dam itself can be bevelled as shown at (K) and as further described below.

In an alternative embodiment of the invention, the interface is provided by a window dam comprising a ceramic material as shown, for example, as (9) in FIG. 8. Ceramic materials are in general strong, rigid, abrasion resistant, impermeable to adhesives, and are transparent to microwave energy. Aluminum oxide (alumina), is the preferred ceramic material to be used, although other ceramics, such as beryllia or glass (silicon dioxide), may be employed. Beryllia dams generally demonstrate superior thermal stress resistance, but the high cost and potential toxicity of beryllia render this a less-preferred alternative. A ceramic window dam which consists essentially of a block of the selected material, may be made by any conventional method known in the art.

Preferably, the window dams are constructed so that any reflection of microwave energy back toward the microwave generator is minimized. This may be accomplished by adjusting the thickness of the window dam so that the phase shift between microwaves reflected from the free side of the window dam facing the microwave generator and the microwaves reflected from the outer surface of the window dam (the interface) back toward the generator, is 180°.

The end of the waveguide where it meets with the window dam will tend to result in a distorted electric field which may cause localized overheating near the edge of the work piece. Preferably, the thickness of the window between the end of the waveguide and the workpiece is sufficiently great to allow the electric field to regain substantial uniformity before the energy is transmitted to the curable assembly being processed.

In either of the embodiments of this invention the metal portions of the waveguide are desireably positioned at a sufficient distance from the curable assembly to substantially equalize fringing electric fields before the microwaves reach the curable assemblies. The fields need not be totally equalized but they should be equalized sufficiently to avoid burning or damage to the assembly. As noted above, the spacing can be accomplished by the dam members alone. If the curable assembly has a belt, such as a plastic belt, which is located at its side and moves with it (as described below), the thickness of such belt can provide part of the spacing means for the microwave guide. Typically spacings may range from about $\frac{1}{4}$ inch to about $1\frac{1}{2}$ inch, although other spacings may be employed. Generally the spacing will be at least as great as the distance between the plane of the inside of the waveguide and the nearest belt. The determination of the spacing for any particular wave guide readily can be determined.

In accordance with a further embodiment of the invention, means are provided to prevent the accumulation of adhesive and debris on and to minimize abrasion of the face of the window dam. Accumulation in the area of the microwave interface can result in overheating of the curable assemblies and thermal or electrical damage to the microwave applicator. The means may comprise a means to continuously apply a lubricant coating such as a wax or a silicone oil to the face of the window dam or to the side of the curable assemblies which face toward it. For example, as seen in FIG. 5, means such as a roller (11) may be positioned to contact the side of the curable assemblies which face toward the window dam, upstream of the window dam, fed by a wick (12) in a lubricant reservoir (42) so as to continuously coat the side of the curable assemblies. In another embodiment, as seen in FIG. 6, nozzles (13) may be installed in the side dam upstream of the window dam to direct lubricant onto the side of the curable assemblies.

Instead of (or in addition to) a lubricant, steam or any gas may be directed against the side of the curable assembly to clean the surface of excess glue or debris. Indeed, heating the side of the assembly by itself is beneficial to cause a cure of the resin at the surface which then has a reduced tendency to be removed as it passes over the dam.

Alternatively or in combination with a lubricant coating, a strip of lubricious material may be fed past the face of the window dam with the curable assemblies. Such strip prevents or reduces build-up of adhesive or debris in the area of the microwave interface. Such strip may be, for example, wax paper, a plastic belt or the like. The wax paper is employed as a disposable strip which is carried with the edge of the assembly. A belt of plastic can be an endless belt which continuously passes over the face of the dam. Such a device is shown in FIG. 7 as endless belt (14), trained around rollers (40). Where the means is an endless belt of plastic (see FIG. 7), means (15), e.g., a scraping device, can be provided to continuously clean the belt surface at a convenient point in the path of the belt, outside the press chamber. Polytetrafluoroethylene is particularly preferred as the material used for making endless belts, but any other plastic having acceptable strength, lubricity and inertness may be used. Suitable means may be provided for driving the web or belt material to be used, or the motion of the curable assemblies across the face of the window dam may be permitted to effect such movement. If desired, gas jets (e.g., air or steam) may be provided in the quarter wavetrap area 17 of the microwave applicator (FIG. 8, to be described below) to minimize condensation of hot adhesive vapors by continuously flushing the vapors from the area.

If desired, two or more independent microwave sources may be installed in the press with separate sets of waveguides and window dams. These multiple sources may be arranged on the same or opposite sides of the press chamber and can be positioned, for example, in the manner disclosed in U.S. Pat. No. 4,020,311. Multiple and single microwave sources may also be placed in positions relative to each other so as to minimize damage to the microwave generators caused by the impinging of microwave energy thereon. This may be accomplished using conventional methods such as are disclosed in U.S. Pat. Nos. 3,594,530; 3,670,133; 3,711,674; 3,712,971; 4,020,311; and 4,093,840.

It has been found that close but imperfect electrical and mechanical contact between the press belts and the waveguide results in electrical arcing and consequent damage to the belts, as microwaves enter into the gap between the belts and the waveguide. It is, however, desirable that these belts and the waveguide be placed in close proximity, in order to minimize escape of microwave energy from the press. Due to the imperfect nature of any physical contact between moving belts and the waveguide and the high power flowing in the guides, it is very difficult to avoid arcing. It has been found, according to the invention, that microwave chokes may be employed so as to effectively eliminate the electric arcing between the belts and the waveguide. One major advantage to this aspect of the present invention is that the imperfect environment at the common boundary between the press belts and the waveguide does not destroy the effectiveness of the microwave chokes. In the nature of microwaves, electric fields build up particularly at sharp edges and corners of objects. In the case of the interface between a metal belt and a waveguide, the first point of contact is the cause of most of the arcing problem. By following the practice of this invention, the potential for damage to the belts is substantially reduced. Importantly, the microwave choke of this invention permits lateral movement of the belt without increasing the risk of arcing.

The microwave $\frac{1}{4}$ wavelength chokes of the invention establish the point of physical contact between the waveguide and belts of the press at a point $\frac{1}{4}$ wavelength from the entrance to the chokes. The $\frac{1}{4}$ wavelength chokes are $\frac{1}{2}$ wavelength in total length, so as to minimize electric arcing at the actual point of contact between the waveguides and the steel press belts, which can destroy the press belts. In practice, each microwave waveguide employs two chokes, one at the top and one at the bottom.

One embodiment of a $\frac{1}{4}$ wavelength choke as used in the invention is shown in FIG. 8. This Figure illustrates a cross-sectional front view of the press section of the continuous press. The waveguide (6) is connected to the window dam (9) which is made of suitable rigid material which is transparent to microwaves, and one side of which forms the interface (10) with the curable assemblies passing through the press. The waveguide (6) does not make direct contact with the belts (1a) and (1b) but is separated therefrom by metal plates (16) which are mechanically and electrically secured to waveguide (6) and are in contact with the moving belts (1a) and (1b).

Preferably, the plates (16) overlap the press belts by at least about 3 inches. The metal of plates (16) should be chosen to prevent galling with the moving press belts (1a) and (1b). Brass or bronze may, for example, be used for plates (16). Choke wedges (17) are set into the top and bottom walls of the waveguide as shown, forming ¼ wavelength chokes. The chokes (17) extend into the waveguide walls (6) for a distance equal to ⅛ the wavelength of the microwaves being used. Hence, the distance from point E to point G in FIG. 8 is ⅛ the wavelength of the microwaves. The ends of the plates (16) are located at point F, midway between point E and point G. The end of plate (16) is ¼ wavelength from both point E and point G.

The theory of ¼ wave chokes is explained in *Microwave Engineering*, T. Koryu Ishii, (The Ronald Press Co., New York 1966), pages 135-136 and 108-110. As explained in this reference, a shorting device, here the back wall (19) of the waveguide at the end of the ¼ wave choke, should be placed at a distance (2n+1)×(wavelength)/4 farther away from the microwave generator from the point where it is desired to stop microwave propagation. The variable "n" is any integer, and the wavelength is the wavelength of the microwaves being used. Hence, where n equals zero, which is preferred for practice in the invention, the distance from point F to point G must be ¼ wavelength. The invention is discussed in terms of ¼ wavelength chokes (n=zero), to avoid confusion. However, it is to be understood that "n" may be any integer.

In operation, and with reference to FIG. 8, microwave energy is fed through the waveguide passageway (20) and some of the microwaves find their way around the end of the waveguide wall (18) at point E and proceed back along the microwave-transparent choke wedge (17) which constitutes an extension of the waveguide. When the microwaves reach point G they are reflected back in the opposite direction from the metallic surface of the back wall (19) of the waveguide. The electric current is reduced to a non-arcing amplitude at point F. Hence, the potential for arcing is at a minimum at point F where the metal plate (16) first contacts the belt (1a) or (1b), which is where such problems would normally be expected to arise.

FIG. 8 also illustrates the orientation of the inner portion (22) of the window dam (9) to the window socket (24) formed by the end portions of the waveguide (6). When a sandwich-type dam is used, a feature such as window pocket (24) is not required because the metal members of the dam can be attached to the waveguide housing. (Further aspects of FIG. 8 will be discussed in more detail below).

FIGS. 9-10 illustrate in further detail how the window dam (9), plates (16), and chokes (17) may be fitted together in the press. As shown in FIG. 9, the surface of the upper face of the window dam (9) is cut back in the region labelled H forming a raised portion (38), in order to accommodate the plate (16) which fits on top of the window dam (9). Similar provisions are made at the bottom face of the window dam (9).

The angle J (FIG. 9) may be approximately 60° but other angles may be substituted. The corners of the window dam (9) forming the interface (10) may be bevelled as shown in FIG. 4 at points labelled (K) if desired. This may allow curable assemblies to pass more smoothly across the face of the window dam.

The top surface of the choke wedge (17) is cut away in a manner similar to that described above for the window dam (9) forming a raised portion (36). When the window dam (9) and the choke wedge (17) are fitted together with the waveguide (6) (see also FIG. 8) the areas cut away from the window dam and choke wedge top surfaces form a continuous planar surface which accommodates the cut-out portion (34) of plate (16) as shown in FIG. 9.

The choke wedge (17) should be at least as long as the width of the waveguide (6) (the width of the waveguide is the dimension in the direction (B)) in order to operate as a wave choke.

In the embodiment shown in FIG. 9, the metal plate consists of three portions 16a, 16b and 16c of varying thickness (alternatively, the metal plate may be of uniform thickness). Contact between the press belt of the press and the waveguide is effected in this embodiment by the surface of the metal plate having the thickness (16b).

The portion (16c) of the metal plate has been cut to a relatively lesser thickness (than the 16b portion) from the side which faces the press belt in the operative continuous press. This feature reduces friction and abrasion between the metal plate and the press belt in an area relatively distant from the center of the width of the press (where the press section is located).

The portion (16a) of the surface of the metal plate (16) has also been cut away to a lesser thickness than the (16b) portion, in order to provide extra space between the press belt and the metal plate in the (16a) region. Since this embodiment assumes that curable assemblies will move in the direction (B) as shown in FIG. 9, this extra space in the region of the (16a) portion of the metal plate will serve as a receptacle for residual material from curable assemblies, which material may become trapped between the press belt and the (16b) region of the metal plate during operation. This provision reduces the risk of jamming of the press with curable assembly residue.

FIG. 10 shows an elevational cross-section of the press section of the continuous press taken on line [10—10] of FIG. 3. The window dam (9), metal plates (16), side walls (5) and waveguide (6) form an essentially continuous surface over which a side of a curable assembly may pass, e.g., in the direction (B).

The purpose of the ¼ wavelength choke is to reduce the leakage of microwave energy into the gap between the plate (16) and the belt (1a) or (1b). (See FIG. 8). To this end it is desirable that the distance between the waveguide wall (6) and the belt (e.g., (1a)) at point F be large compared to the gap between the plate (16) and the belt (1a) at the same point F so that the proportion of energy leaking between the plate and the belt is kept small relative to the proportion of energy passing to the end of the ¼ wavelength choke.

In one embodiment, the surfaces of the waveguide walls facing away from the choke wedges (17) are tapered near the point where the waveguide walls meet the window dam. This modification is shown in FIG. 11. FIG. 11 also illustrates the shape of the inner portion (32) of the window dam (30), modified to accommodate the shape of the end portion of the waveguide (6). The shape of the choke wedge (26) fitting against the back wall of the waveguide (19a) is also shown.

Energy leakage between the plate (16) and the belt (1a) at the top of the apparatus (similar provisions for belt (1b) are also made) may be minimized by reducing the distance between the waveguide wall (6) and the belt (1a) at point E relative to the spacing at point F. An arrangement for achieving this is shown in FIG. 8. Another arrangement for achieving this is shown in FIG. 12. With this arrangement, the field strengths of microwaves finding their way back along the choke wedge (28) are attenuated by the gradually increasing gap between the waveguide wall (6) and the belt (1a) so that less total energy is available at the gap between the belt and the waveguide at point F. Therefore, proportionately less energy can leak into the gap between metal plate (16) and belt (1a). From the point of view of reducing the field strength at point F, the closer the waveguide wall (6) is to the belt (1a) at point E, the better. However, the waveguide and the belt must not be close enough at point E to permit arcing between the wall and the belt. FIG. 12 illustrates the shape of the inner portion (32) of the window dam (30), and the back wall of the waveguide (19b) is also shown.

The choke wedges (17) of the $\frac{1}{4}$ wavelength chokes may be made of any material which is transparent to the microwaves being used and not otherwise detrimental to the functions of the system. For example, the choke wedges (17) may comprise polytetrafluoroethylene or other polymers, aluminum oxide, beryllia, glass, or air.

The wavelength of the microwaves in the $\frac{1}{4}$ wavelength chokes is related to the dielectric constant of the side piece material. Side pieces made of materials with higher dielectric constants permit the use of shorter $\frac{1}{4}$ wavelength choke path lengths. Since the dielectric constant of aluminum oxide is high, aluminum oxide is preferably used, because the actual length of the $\frac{1}{4}$ wavelength chokes may thus be shortened.

In a specific exemplification of this invention, eight foot long Douglas fir wood strands having a cross section of about $\frac{1}{8}''$ by $\frac{1}{2}''$ were coated with a heat-curable alkaline phenol-formaldehyde resin to provide a resin solids content of about 4% based on dry wood content. The strands were formed into a parallel oriented curable assembly of 12" by 12". This assembly was continuously passed and compressed between moving opposed endless steel press belts. The assembly was subjected to pressure which was estimated to be approximately 600 p.s.i. and was retained by side dams positioned between the belts and spaced 12" apart. The assembly was compressed to a dimension of 12" by 4".

Each side dam contained a microwave waveguide and quarter wave traps of the type shown in FIG. 8. The microwave window was made of alumina, and was about $\frac{1}{8}$ wavelength thick, i.e., 2$\frac{1}{2}$ thick. The microwave guides had inside dimensions of 2$\frac{1}{2}''$ by 10" and were powered by a 30 Kw, 915 MHz microwave generator.

The assembly was moved through the press at about 1 foot/minute and was subjected to about 18 Kw of microwave power from each guide. The assembly reached a temperature between about 105° C. and 130° C. The residence time in the press after heating was about six minutes. Following exit from the press the product was cooled to ambient temperatures. The resin binder in the product was fully cured.

The term "curable assembly" as used in the claims is intended to broadly encompass any object which may benefit from being simultaneously exposed to microwaves and pressure in a press; the invention is not limited to the curing of adhesives. For example, the present invention can be employed in the vulcanization of rubber materials, curing of plastics including foamed resins, and the like.

If a press is used, for example with electrically nonconductive belts such as polytetrafluoroethylene, the $\frac{1}{4}$ wave chokes may be omitted. Indeed, in proper circumstances, features including the $\frac{1}{4}$ wave choke, the side dam, and the spacing of the metal waveguide from the curable assembly may be utilized in a press independent of each of the others. For example, if the curable assembly comprises a laminated beam or laminated veneer lumber the pressure of the continuous press results in no lateral force and stress bearing side dams are not required. The $\frac{1}{4}$ choke feature of this invention and the spacing of the waveguide from the workpiece, nevertheless, are important in permitting such assemblies to be cured evenly in a continuous press with microwave heat.

While the preferred embodiments of this invention have been discussed herein, those skilled in the art will appreciate that changes and modifications may be made therein without departing from the spirit and scope of this invention, as defined in and limited only by the scope of the appended claims.

I claim:

1. An apparatus for the simultaneous application of pressure and microwaves to curable assemblies comprising:

a continuous press including two endless metal press belts forming a nip region, the press belts being disposed to apply pressure to curable assemblies inserted therebetween, and including an inlet and an outlet for the passage of curable assemblies, a press chamber defined by the two belt surfaces and by two side walls, means to apply microwaves to the curable assemblies from at least one microwave generator through a waveguide forming an interface with the press chamber located in an opening in at least one of said side walls, said waveguide spanning substantially the entire vertical spacing between said belts dam means at the interface between the waveguide and the press chamber to provide a solid interface between said curable assembly and said waveguide to withstand the lateral pressure exerted thereon by curable assemblies being pressed, and which effectively permits propagation of microwaves into the press chamber said microwaves having an electric vector substantially normal to the plane of said press belts, said dam means being selected from the group consisting of a solid ceramic member and a reinforced member containing spaced metal elements normal to the electric vector of the microwave field, said waveguide being positioned from the near-edge of the curable assembly at a distance sufficient to permit substantial equalization of fringing electric fields, and said waveguide including a $\frac{1}{4}$ wave choke adjacent each moving belt for effectively establishing the point of contact between the waveguide and the press belts at a point $(2n+1)$ (wavelength of the microwave energy being used)/4, from the microwave path entrance to the wave choke, where n is an integer.

2. The apparatus of claim 1 wherein the dam comprises a solid block of a ceramic material.

3. The apparatus of claim 2 wherein the dam comprises a solid block of alumina.

4. The apparatus of claim 1 wherein the dam comprises a plurality of spaced layers of a metal normal to the electric vector with alternating layers which are transparent to microwaves.

5. The apparatus of claim 4 wherein the dam comprises a plurality of layers of aluminum sandwiched between alternating layers of air.

6. The apparatus of claim 4 wherein a microwave transparent facing is provided on the side of the dam facing into the press chamber which acts as an interface between the metal layers and the press chamber, said facing being selected from the group consisting of plastic and ceramic.

7. The apparatus of claim 1 wherein the thickness of the dam is determined such that the phase shift between microwaves reflected from the side of the dam facing the microwave generator and microwaves reflected from the interface back toward the generator is 180°.

8. The apparatus of claim 1, which includes means for applying a lubricant coating to said dam face to prevent the accumulation of adhesive and debris on and to minimize abrasion of the surface of the dam means.

9. The apparatus of claim 1 wherein a strip of lubricious material is passed across the face of the dam to prevent the accumulation of adhesive and debris on and to minimize abrasion of the surface of the dam means.

10. The apparatus of claim 9 wherein said strip is wax paper.

11. The apparatus of claim 9 wherein said strip is an endless plastic belt.

12. The apparatus of claim 1, which includes means for establishing a point of contact between the waveguide and the press belts comprising metal plates positioned between the waveguide and each of the two press belts said plates being in good electrical contact with said waveguide.

13. The apparatus of claim 12 wherein the metal plates are brass.

14. The apparatus of claim 1 which includes means for directing a gas against the side of the curable assembly before the assembly reaches said microwave heating means.

15. The apparatus of claim 1 which includes means to direct a cleaning gas at the interface between said wave choke element and said steel belt.

16. A method for simultaneously exposing a curable assembly to pressure and microwaves comprising steps of:

continuously advancing a curable assembly between metal press belts of a continuous press through a press chamber region wherein two side walls bridge the gap between the press belts to prevent lateral expansion of the curable assembly under compression, directing microwaves having an electric vector substantially normal to the plane of said press belts into the curable assembly in the press chamber region through a waveguide positioned in at least one of said side walls and oriented in a direction substantially parallel to the planes of the press belts, said waveguide spanning substantially the entire vertical spacing between said belts, wherein a microwave transparent dam is provided at the interface between the waveguide and the press chamber to provide a solid interface between said curable assembly and said waveguide to withstand the lateral pressure exerted thereon by curable assemblies being pressed, positioning the metal portions of said waveguide at a sufficient distance from said curable assembly to substantially equalize fringing electric fields before the microwaves reach the curable assembly, avoiding arcing between the belts and the waveguide with ¼ wave traps integral with said waveguides adjacent each said moving belt, for effectively establishing the point of contact between the waveguide and the press belts at a point (2n+1) (wavelength of the microwave energy being used)/4, from the microwave path entrance to the wave trap, where n is an integer and removing the curable assembly from the continuous press after the curable assembly has been exposed to microwaves sufficient to effect cure.

17. The method of claim 16 wherein the curable assembly comprises (1) strips, strands, or particles of wood, or a mixture thereof, and (2) an adhesive.

18. The method of claim 16 wherein the curable assembly comprises strands of wood at least about 12 inches long containing from about 1 to about 10 percent by weight resin and the assembly is subjected to a microwave frequency of from about 100 to about 10,000 MHz to heat the assembly to a temperature of from about 100° C. to about 170° C.

19. The method of claim 16 wherein gas is directed against the side of the curable assembly while said assembly is in said press but before said assembly reaches the microwave heater.

20. The method of claim 19 wherein said gas is heated.

21. The method of claim 16 wherein a cleaning gas is directed at the interface between said metal press belts and said wave trap.

22. In a continuous press including two endless metal press belts forming a nip region, the press belts being disposed to apply pressure to curable assemblies inserted therebetween, and including an inlet and an outlet for the passage of curable assemblies, and a chamber defined by the two belt surfaces in the nip region and by two side walls, the improvement comprising means to apply microwaves to the curable assemblies from at least one microwave generator through a waveguide forming an interface with the press chamber located in an opening in at least one of said side walls, said microwaves having an electric vector substantially normal to the plane of the press belts, wherein the waveguide spans substantially the entire perpendicular spacing between the press belts in the nip region, and wherein two wave chokes integral with the waveguide are provided at the common boundary between the waveguide and the two press belts, for effectively establishing the point of contact between the waveguide and the press belts at a point (2n+1) (wavelength of the microwave energy being used)/4, from the microwave path entrance to the wave chokes, where n is an integer.

23. The apparatus of claim 22 which includes means to position the metal portions of the waveguide at a sufficient distance from said curable assembly to substantially equalize fringing electric fields before the microwaves reach the curable assemblies.

* * * * *